US010593085B2

(12) United States Patent
Kemelmaher

(10) Patent No.: US 10,593,085 B2
(45) Date of Patent: Mar. 17, 2020

(54) COMBINING FACES FROM SOURCE IMAGES WITH TARGET IMAGES BASED ON SEARCH QUERIES

(71) Applicant: Facebook, Inc., Menlo Park, CA (US)

(72) Inventor: Irena Kemelmaher, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/642,819

(22) Filed: Jul. 6, 2017

(65) Prior Publication Data

US 2018/0012386 A1    Jan. 11, 2018

Related U.S. Application Data

(60) Provisional application No. 62/358,749, filed on Jul. 6, 2016.

(51) Int. Cl.
| | |
|---|---|
| *G06T 11/60* | (2006.01) |
| *G06F 16/51* | (2019.01) |
| *G06F 16/58* | (2019.01) |
| *G06F 16/583* | (2019.01) |
| *G06F 16/53* | (2019.01) |
| *G06T 7/00* | (2017.01) |

(52) U.S. Cl.
CPC .............. *G06T 11/60* (2013.01); *G06F 16/51* (2019.01); *G06F 16/53* (2019.01); *G06F 16/58* (2019.01); *G06F 16/5854* (2019.01); *G06T 7/97* (2017.01)

(58) Field of Classification Search
None
See application file for complete search history.

(56) References Cited

U.S. PATENT DOCUMENTS

| | | | | |
|---|---|---|---|---|
| 2009/0024619 | A1* | 1/2009 | Dallmeier | .......... G06K 9/00771 |
| 2009/0252435 | A1 | 10/2009 | Wen et al. | |
| 2012/0005595 | A1* | 1/2012 | Gavade | ................ G11B 27/034 |
| | | | | 715/751 |

(Continued)

FOREIGN PATENT DOCUMENTS

JP    2014-067117 A    4/2014

OTHER PUBLICATIONS

PCT International Search Report and Written Opinion, PCT Application No. PCT/US2017/040902, dated Oct. 23, 2017, 12 pages.

*Primary Examiner* — Xiao M Wu
*Assistant Examiner* — Steven Z Elbinger
(74) *Attorney, Agent, or Firm* — Fenwick & West LLP

(57) ABSTRACT

In some embodiments, a source image depicting a face can be accessed. A portion of the source image that depicts the face can be determined. A search query can be acquired based on user input. A set of one or more target images associated with the search query can be identified. A respective location, within each target image from the set of one or more target images, where the portion of the source image is to be rendered can be identified. For each target image from the set of one or more target images, the portion of the source image can be rendered at the respective location within each target image to produce a set of one or more combined images. Each combined image in the set of combined images can include the portion of the source image rendered at the respective location within each target image.

18 Claims, 6 Drawing Sheets

(56) References Cited

U.S. PATENT DOCUMENTS

| | | | |
|---|---|---|---|
| 2013/0343643 A1* | 12/2013 | Perlmutter | G06K 9/00288 382/159 |
| 2014/0112534 A1* | 4/2014 | Sako | G06F 21/6245 382/103 |
| 2014/0153832 A1* | 6/2014 | Kwatra | G06T 11/00 382/195 |
| 2015/0294136 A1* | 10/2015 | Musial | G06K 9/00281 382/118 |
| 2016/0027474 A1 | 1/2016 | Chao et al. | |
| 2016/0147793 A1* | 5/2016 | Nomoto | G06F 17/30256 707/740 |
| 2017/0097948 A1* | 4/2017 | Kerr | G06F 3/0482 |

* cited by examiner

600

Apply an image classification algorithm to each image in a plurality of images
602

Determine that each image in the plurality of images has a respective set of one or more associations with one or more search queries
604

Store the plurality of images and the respective set of one or more associations for each image in the plurality of images
606

Determine a second portion of the source image that depicts a second face
702

↓

Identify a respective second location, within each target image, at which the second portion of the source image is to be rendered
704

↓

Render the second portion of the source image at the respective second location within each target image
706

FIG. 7

COMBINING FACES FROM SOURCE IMAGES WITH TARGET IMAGES BASED ON SEARCH QUERIES

CROSS REFERENCE TO RELATED APPLICATIONS

This application claims the benefit of U.S. Provisional Application No. 62/358,749, filed Jul. 6, 2016, which is herein incorporated by reference in its entirety.

BACKGROUND

This disclosure relates generally to multimedia processing, and in particular, to combining multimedia or media content items.

Today, people often utilize computing devices (i.e., computing systems) for a wide variety of purposes. Users can use their computing devices to, for example, interact with one another, access content, share content, and create content. In some cases, users can utilize their computing devices to generate, download, view, access, or otherwise interact with multimedia (i.e., media) content, such as images, videos, and audio. For example, users of an online system or service (e.g., a social networking system or service) can, via their computing devices, download media content for viewing, upload media content for sharing, or interact with information associated with media content.

In some instances, media processing can be performed or applied with respect to content, such as images that include depictions or representations of faces of people. Under conventional approaches rooted in computer technology, media processing operations performed or applied to such media content can produce results that are unrealistic, inefficient, or uninteresting. In one example, utilizing media processing to enable e-commerce customers to view themselves in virtual clothing items can be inflexible, boring, inaccurate, or incapable of being conveniently personalized/customized. As such, conventional approaches can create challenges for or reduce the overall experience associated with utilizing, accessing, or interacting with media content.

SUMMARY

People use computing systems (or devices) for various purposes. Users can utilize their computing systems to establish connections, engage in communications, interact with one another, and/or interact with various types of content. In some cases, computing devices can include or correspond to cameras capable of capturing or recording media (i.e., multimedia) content, such as images or videos (which can be formed based on sets of video image frames or still frames). Often times, media content such as an image can depict, represent, or include one or more objects. An example of an object within an image can include, but is not limited to, a user (e.g., a user's face) or a portion thereof.

Conventional approaches rooted in computer technology for media processing can attempt to modify an image that depicts, represents, or includes a face. However, conventional media processing approaches can produce limited, inflexible, or impractical results. For example, in some cases, conventional approaches can only provide a limited number of modifications to the image. In another example, conventional approaches can only provide a default or preconfigured modification to the image, such that user input and/or choice is unavailable. In a further example, conventional approaches can often times produce a modification to the image that does not appear sufficiently realistic or accurate. Accordingly, in many instances, utilizing conventional approaches for media processing can be challenging, inefficient, and/or undesirable.

Due to these or other concerns, conventional approaches can be disadvantageous or problematic. Therefore, an improved approach can be beneficial for addressing or alleviating various drawbacks associated with conventional approaches. Based on computer technology, the disclosed technology can acquire or access a source image depicting a face. For instance, a user can utilize a computing device to capture and/or input (e.g., upload, submit, etc.) the image. A portion of the source image that depicts the face can be identified or determined. In some cases, one or more object recognition and/or detection techniques can be utilized to identify, detect, or locate the portion of the source image that depicts or represents the face. Moreover, a search query can be acquired based on user input. In some implementations, the search query can be acquired and generated based on text inputted by a user. In some embodiments, the disclosed technology can define (i.e., predefine, preset, etc.) a plurality of search queries, can provide the plurality of defined search queries to a user, and can receive, obtain, or otherwise acquire a selection by the user of a particular search query out of the provided plurality of defined search queries.

Furthermore, the disclosed technology can identify a set of one or more target images that are associated with the search query. For example, the set of target images can be identified from a plurality of target images that have already been recognized, classified, and/or labeled as being associated with which search queries (e.g., terms, keywords, phrases, topics, themes, labels, tags, etc.). Each of the target images can also depict or represent one or more faces. The disclosed technology can identify, within each target image from the set of one or more target images, a respective location where the portion of the source image is to be rendered. In an example, the respective location within each target image can be identified based on where a face is depicted or represented in each target image.

For each target image from the set of one or more target images, the disclosed technology can render the portion of the source image at the respective location within each target image in order to produce a set of one or more combined images. Each combined image in the set of combined images can include the portion of the source image rendered at the respective location within each target image. For instance, each combined image can correspond to a composite image in which the face from the source image is mapped onto each target image that matches the search query. In this instance, the disclosed technology can mix or blend (the edges of) the face portion of the source image with (the edges of) the respective location within each target image where the source image face portion is rendered, such as to improve the overall appearance, the naturalness, and/or the intended realism of the composite image.

It should be appreciated that many other features, applications, embodiments, and/or variations of the disclosed technology will be apparent from the accompanying drawings and from the following description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 6 illustrates a flowchart describing an example process associated with combining faces from source images with target images based on search queries, in accordance with an embodiment.

FIG. 7 illustrates a flowchart describing an example process associated with combining faces from source images with target images based on search queries, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
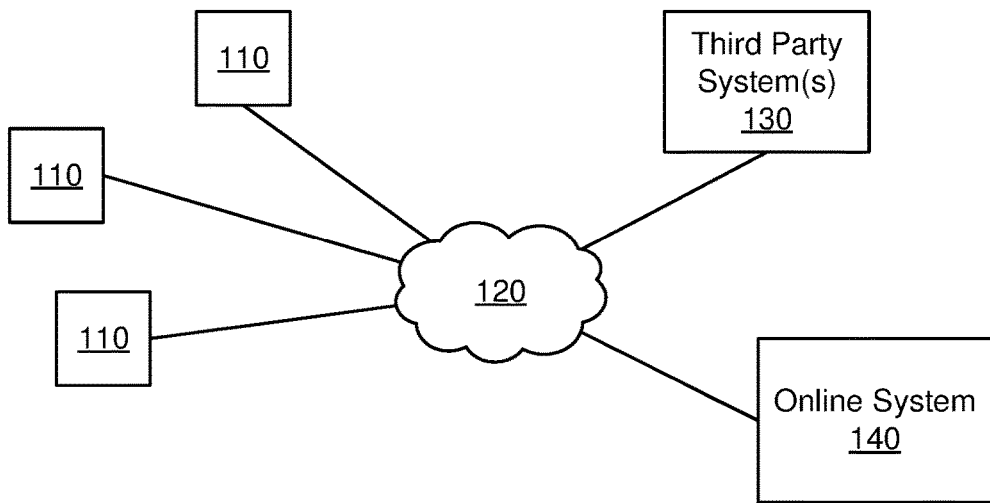
FIG. 1 illustrates a block diagram of an example system environment in which an example online system operates, in accordance with an embodiment.

FIG. 1 illustrates a block diagram of an example system environment 100 in which an example online system 140 operates, in accordance with an embodiment. The example system environment 100 shown in FIG. 1 can comprise one or more client devices 110, a network 120, one or more third party systems 130, and the online system 140. In alternative configurations, different and/or additional components may be included in and/or removed from the system environment 100. In some cases, the online system 140 can, for example, be a social networking system, a content sharing network, and/or another system for providing content to users of the system, etc.

The client devices 110 can be one or more computing devices or systems capable of receiving user input as well as transmitting and/or receiving data via the network 120. In one implementation, a client device 110 is a conventional computer system, such as a desktop or a laptop computer. Alternatively, a client device 110 may be a device having computer functionality, such as a personal digital assistant (PDA), a mobile telephone, a smartphone, a wearable device, or another suitable device. A client device 110 can be configured to communicate via the network 120. In one embodiment, a client device 110 executes an application allowing a user of the client device 110 to interact with the online system 140. For example, a client device 110 can execute an application provided by the online system or a browser application in order to enable interaction between the client device 110 and the online system 140 via the network 120. In another embodiment, a client device 110 can interact with the online system 140 through an application programming interface (API) running on a native operating system of the client device 110, such as IOS® or ANDROID™. It should be understood that many variations are possible.

The client devices 110 can be configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 can include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

Moreover, one or more third party systems 130 may be coupled to the network 120 for communicating with the online system 140, which is further described below in conjunction with FIG. 2. In some embodiments, a third party system 130 is an application provider communicating information describing applications for execution by a client device 110 or communicating data to client devices 110 for use by an application executing on a client device 110. For example, the third party system 130 can develop or provide one or more applications associated with various embodiments of the disclosed technology. In this example, the disclosed technology, or at least a portion thereof, can be implemented via or included in the one or more applications. In some implementations, a third party system 130 can provide content or other information for presentation via a client device 110. A third party system 130 may also communicate information to the online system 140, such as advertisements, content, or information about an application provided by the third party system 130. In some embodiments, a third party system 130 can be a content provider, such as an advertiser, within the online system 140. For instance, the content provider can correspond to an admin or manager of a resource, such as a page, within the online system 140. Many variations associated with the disclosed technology are possible.

Figure 2:
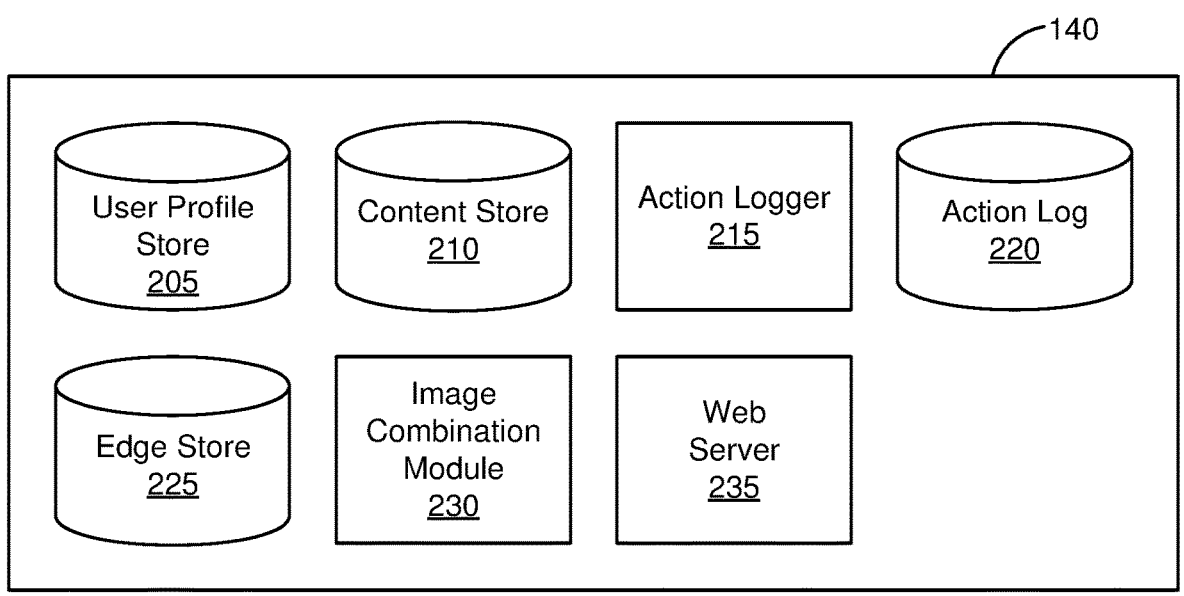
FIG. 2 illustrates a block diagram of an example online system, in accordance with an embodiment.

FIG. 2 illustrates a block diagram of an example online system 140, in accordance with an embodiment. The online system 140 shown in FIG. 2 can include a user profile store 205, a content store 210, an action logger 215, an action log 220, an edge store 225, an image combination module 230, and a web server 235. In some embodiments, the online system 140 may include additional, fewer, or different components/modules for various applications. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, modules can be implemented, in part or in whole, as software running on one or more computing devices or systems, such as on a user or client computing device. For example, a module or at least a portion thereof can be implemented as or within an application (e.g., app), a program, an applet, or an operating system, etc., running on a user computing device or a client/user computing system. In another example, a module or at least a portion thereof can be implemented using one or more computing devices or systems which can include one or more servers, such as network servers or cloud servers. In some instances, a module can, in part or in whole, be implemented within or configured to operate in conjunction with the online system or service 140, such as a social networking system or service. Moreover, conventional components such as network interfaces, security functions, load balancers, failover servers, management and network operations consoles, etc., are not explicitly shown so as to not obscure the details of the system architecture.

Each user of the online system 140 can be associated with a user profile, which is stored in the user profile store 205. A user profile may include declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represents various types of content. Examples of content represented by an object include a page post, a status update, a photograph or image, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third party applications or third party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 can be uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects.

For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

Furthermore, the image combination module 230 can be configured to facilitate receiving, obtaining, accessing, or otherwise acquiring a source image (i.e., an input image) depicting or representing a face. The image combination module 230 can also be configured to determine, identify, detect, or locate a portion (e.g., a sub-image) of the source image that depicts or represents the face. The image combination module 230 can be further configured to facilitate acquiring, receiving, or obtaining, etc., a search query based on user input. The user input can enable a user to generate (e.g., via typing) or select (e.g., via multiple provided options) a search query of his/her choice.

Moreover, the image combination module 230 can identify a set of one or more target images that are associated with the search query. The image combination module 230 can also identify a respective location(s), within each target image from the set of one or more target images, at which the (face) portion of the source image is to be rendered. For instance, each target image can also depict or represent a face(s). The respective location(s) within each target image can be identified based on where the face(s) is depicted, represented, or located within each target image. At the respective location(s) where the face(s) is depicted within each target image, a corresponding portion (e.g., a corresponding sub-image) of each target image can be removed, such that the face(s) is "cut out" from each target image. The image combination module 230 can then render, for each target image from the set of one or more target images, at the respective location within each target image, the portion of the source image in order to produce a set of one or more combined images. Each combined image in the set of one or more combined images can thus include the portion of the source image rendered at the respective location within each target image. For example, each combined image can correspond to each target image with the target image face removed and instead replaced with the source image face. It should be understood that this example is provided for illustrative purposes and that there can be many variations associated with the disclosed technology.

Additionally, the web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or Blackberry OS.

Figure 3:
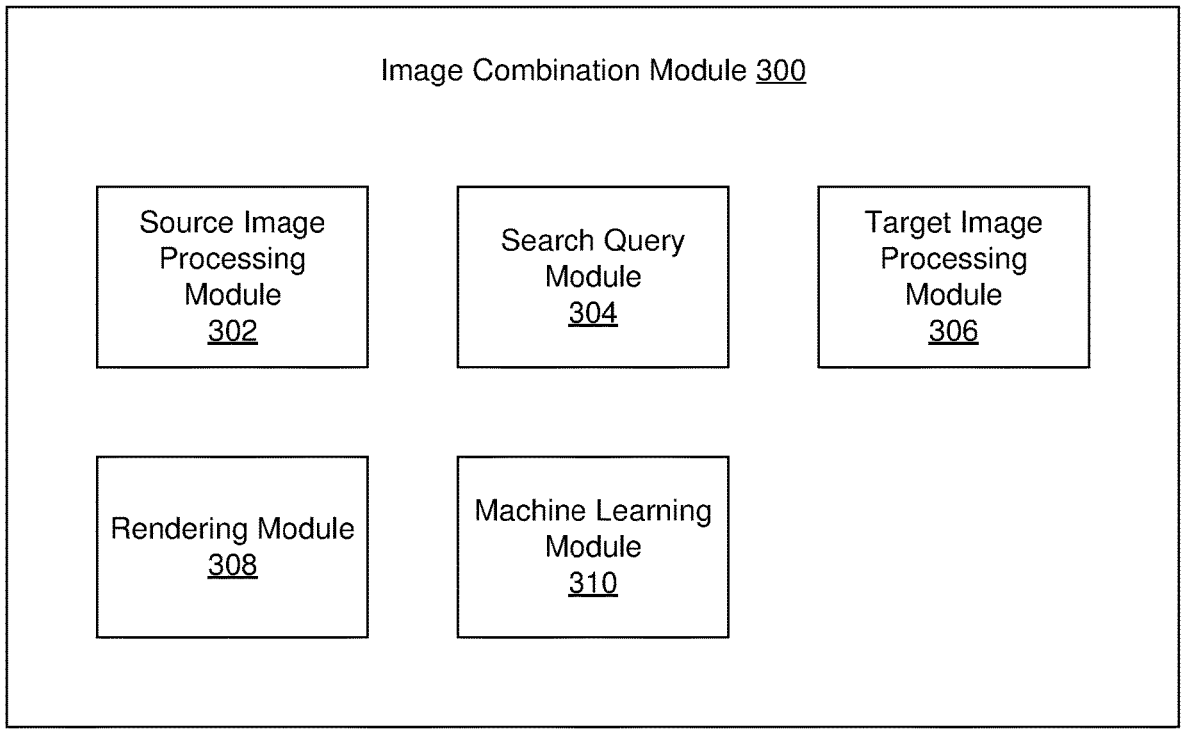
FIG. 3 illustrates a block diagram of an example image combination module, in accordance with an embodiment.

FIG. 3 illustrates a block diagram of an example image combination module 300, in accordance with an embodiment. In some embodiments, the example image combination module 300 can be implemented as the image combination module 230, described above. As shown in the example of FIG. 3, the example image combination module 300 can include a source image processing module 302, a search query module 304, a target image processing module 306, a rendering module 308, and a machine learning module 310.

The source image processing module 302 can be configured to facilitate various operations and/or tasks associated with one or more source images. In some embodiments, the source image processing module 302 can receive, obtain, access, or otherwise acquire a source image depicting a face. A source image can correspond to an image that is selected, submitted, uploaded, or otherwise inputted, such as by a user. In some cases, the source image can be a still image or photograph. In some instances, the source image can be a video image frame which, in conjunction with other video image frames, can form a video.

Various modules (or portions thereof) of the disclosed technology can be implemented together and/or can operate in conjunction. In some embodiments, the source image processing module 302 can work together with the machine learning module 310 to facilitate determining or identifying a portion of the source image that depicts the face. For instance, the machine learning module 310 can train an image analysis model to recognize subject matter in content based on visual attributes of the content. Content may include, for example, media content, such as images, as well as related information or metadata. A visual attribute may include a visual pattern in an image or an image portion/segment reflecting a characteristic property of the subject matter depicted in the content. Visual attributes may be based on one or a combination of, for example, appearance, color, shape, and/or layout, etc. For instance, extracted image features from training data can correspond to visual features of human faces depicted or represented in images.

The machine learning module 310 can train the image analysis model to recognize human faces in image data using at least one image classification algorithm (e.g., a facial recognition algorithm). Accordingly, the source image processing module 302 can be operable with the machine learning module 310 to determine or identify the portion of the source image that depicts the face.

In some embodiments, the image analysis model is an image classifier trained by the machine learning module 310 to recognize visual attributes of an image class based on contextual cues gathered from a sample set of images selected from training data stored in a training data store. The sample set of images may include a sufficiently large number (e.g., beyond a specified threshold quantity) of images to ensure an accurate outcome by the classifier. The classifier may assign each item of content a statistical score corresponding to the extent the content falls within a particular image class. In some embodiments, the classifier may incorporate a hierarchical classifier, a linear classifier, or other classifier. In some embodiments, the classifier may be trained initially based on a selected subset of images maintained by the online system 140. The classifier may be retrained under various circumstances. For example, the classifier may be retrained periodically at a selected frequency or non-periodically as images are made available to the classifier. As another example, the classifier may be retrained upon the occurrence of certain events, such as events (e.g., a sporting event, a music festival, a party, etc.) that are likely to cause a large number of images to be uploaded to the online system 140. As yet another example, the classifier may be retrained when the online system 140 receives a threshold number of new images. Retraining in these and other circumstances can refine the ability of the classifier to recognize visual attributes of image classes.

An image class may include, for example, objects (e.g., a cat, car, person, purse, etc.), human body parts (e.g., beard, faces), brands or objects associated with brands (e.g., Coca-Cola®, Ferrari®), professional sports teams (e.g., the Golden State Warriors®, the San Francisco Giants®), locations or places of interest (e.g., Mount Everest), plants (e.g., various types of orchids), structures (e.g., skyscrapers, bridges, houses), vehicles (e.g., airplanes, bicycles, cars, motorcycles), activities (e.g., swimming, running), phrases or concepts (e.g., a red dress, happiness), and any other thing, action, or notion that can be associated with content. While many examples provided herein may refer to a single "image class", it is noted that the image class may refer to a plurality of image classes or one or more image classes comprising an amalgamation of objects, brands, professional sports teams, locations, etc. Each image class can have multiples sets of image features commonly associated with that image class, e.g., distinct visual features associated with male human faces.

In some embodiments, the machine learning module 310 also trains the image analysis model to differentiate between two images by comparing the two images in a selected representation space. In one embodiment, the machine learning module 310 trains the image analysis model to compare images represented in corresponding color histograms and to measure dissimilarity between the histograms of two images in a variety of distance measure, e.g., $\chi 2$ statistics. In another embodiment, the machine learning module 310 trains the image analysis model to compare images represented in a continuous probabilistic framework based on a mixture of Gaussians models and to measure dissimilarity between two images in terms of KL-divergence. It should be appreciated that many variations associated with the disclosed technology are possible.

Continuing with the example of FIG. 3, the search query module 304 can be configured to facilitate acquiring a search query based on user input. In some cases, the search query module 304 can define (i.e., predefine, preset, etc.) a plurality of search queries. The search query module 304 can provide or present the plurality of defined search queries to a user. As such, the user input can include a selection by the user of the acquired search query out of the provided plurality of defined search queries. Additionally or alternatively, in some instances, the user input can include text provided (e.g., entered, typed, dictated, etc.) by the user. The text can be utilized for generating the search query acquired by the search query module 304.

Furthermore, the target image processing module 306 can be configured to facilitate identifying a set of one or more target images that are associated with the search query. In some embodiments, the target image processing module 306 can operate with the machine learning module 310 to detect, recognize, label, and/or classify objects in target images (or potential target images). The target image processing module 306 can thus label or associate each target image with one or more objects recognized/detected within each target image. For instance, an image that can potentially serve as a target image can depict or represent a face. The face can be that of a 40 year-old man who has spikey hair, a beard, wrinkles, and blue eyes. In this instance, the target image processing module 306 can cause the image to have associations with terms such as "man", "male", "middle-aged", "spikey hair", "beard", "wrinkles", "blue eyes", etc. Such terms can correspond to search queries (or portions thereof).

In some implementations, prior to identifying the set of one or more target images, the target image processing module 306 can operate with the machine learning module 310 to facilitate applying an image classification algorithm (e.g., an object detection algorithm, an object recognition algorithm, etc.) to each image in a plurality of images. The plurality of images can, for example, serve as potential target images. The target image processing module 306 and the machine learning module 310 can facilitate determining, based on applying the image classification algorithm, that each image in the plurality of images has a respective set of one or more associations with one or more search queries (e.g., terms, keywords, phrases, topics, themes, labels, tags, etc.). The target image processing module 306 can store, prior to the source image depicting the face being acquired or accessed, the plurality of images and the respective set of one or more associations for each image in the plurality of images. The target image processing module 306 can then identify the set of one or more target images from or out of the plurality of images. In some cases, identifying the set of one or more target images that are associated with the search query can include determining that each target image from the set of one or more target images has at least a threshold confidence level of matching the search query. For instance, the set of one or more target images can be identified as being the highest ranked images (e.g., based on confidence levels of matching the search query) out of the stored plurality of images.

Moreover, the target image processing module 306 can work together with the machine learning module 310 to facilitate identifying a respective location, within each target image from the set of one or more target images, at which the (face) portion of the source image is to be rendered. In one example, based on a facial recognition algorithm utilized by the machine learning module 310, the target image processing module 306 can determine, locate, or otherwise identify the respective location within each target image at which at least one face is depicted. In some cases, the target image processing module 306 can remove or cut out any faces depicted in each target image, such that the source image face can be rendered at that location within each target image instead. Further, in some instances, the respective location within each target image at which the portion of the source image is to be rendered can be identified prior to the source image depicting the face being acquired or accessed. Many variations are possible.

Additionally, in some embodiments, the source image processing module 302 can facilitate identifying one or more attributes associated with the face depicted via the portion of the source image. The target image processing module 306 can facilitate determining, prior to the portion of the source image being rendered at the respective location within each target image, that each target image from the set of one or more target images is associated with a respective set of one or more attributes that has at least a (specified/calculated) threshold confidence level of matching the one or more attributes associated with the face. Accordingly, in some cases, the set of one or more target images can be identified as being the highest ranked images (e.g., based on confidence levels of matching the search query and/or the source image) out of the stored plurality of images. The one or more attributes can include, for example, at least one of a facial attribute (e.g., facial anchor point, shape, size, feature, property, etc.), a pose attribute (e.g., head tilt, head turn, gesture, expression, etc.), a skin attribute (e.g., color, brightness, texture, etc.), a hair attribute (e.g., color, length, style, etc.), an age attribute (e.g., absolute value, range value, etc.), or a gender attribute (e.g., male, female, etc.). Many variations are possible.

In some implementations, determining that each target image from the set of one or more target images is associated with the respective set of one or more attributes that has at least the threshold confidence level of matching the one or more attributes associated with the face can be based on applying a similarity function to the respective set of one or more attributes associated with each target image and the one or more attributes associated with the face. The similarity function can, for instance, be computed as the distance between the respective set of one or more attributes associated with each target image and the one or more attributes associated with the face. In one example, the similarity function can be based on the following equation: $D(s,t)=\|P_s-P_t\|^2+\|Age_s-Age_t\|^2+D(H_s,H_t)+D(S_s,S_t)$; where D is distance, s is a source image, t is a target image, P is a 3-vector that includes roll, yaw, and pitch angles, Age is an estimated age, H corresponds to histogram of oriented gradients (HoG) features, and S corresponds to skin and hair masks. It should be appreciated that this example is provided for illustrative purposes and that there can be many variations associated with the disclosed technology.

In addition, the rendering module 308 can be configured to facilitate rendering, for each target image from the set of one or more target images, the portion of the source image at the respective location within each target image to produce a set of one or more combined images. Each combined image in the set of one or more combined images can thus include the portion of the source image rendered at the respective location within each target image. For instance, the rendering module 308 can generate each combined image to be a composite image in which the face from the source image is mapped onto each target image that matches the search query (and/or that matches the source image). In this instance, the rendering module 308 can mix or blend (the edges of) the face portion of the source image with (the edges of) the respective location within each target image at which the source image face portion is rendered, such as to improve the overall appearance, the naturalness, and/or the intended realism of the composite image.

Additionally, in some embodiments, the rendering module 308 can modify the source image and/or one or more target images. For example, the rendering module 308 can morph, warp, rotate, translate, shrink, and/or enlarge, etc., the source image and/or the target images (or a portion(s) thereof) as needed. As discussed above, there can be many variations associated with the disclosed technology.

Combining Source Image Faces with Target Images

Figure 4:
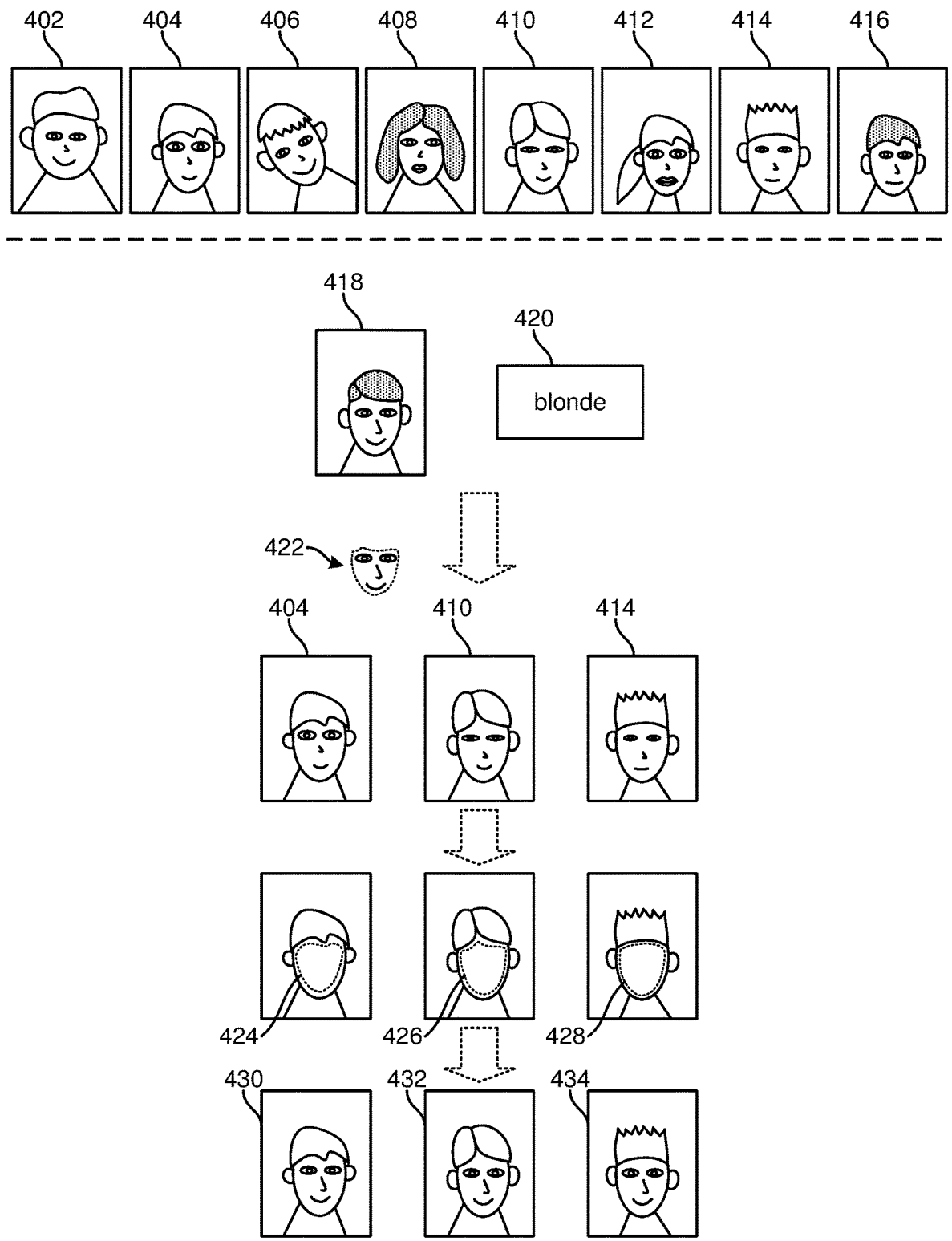
FIG. 4 illustrates an example scenario associated with combining faces from source images with target images based on search queries, in accordance with an embodiment.

FIG. 4 illustrates an example scenario associated with combining faces from source images with target images based on search queries, in accordance with an embodiment. In the example scenario of FIG. 4, there can be a plurality of images (402, 404, 406, 408, 410, 412, 414, and 416) that each depict a respective face. The plurality of images (402, 404, 406, 408, 410, 412, 414, and 416) can be utilized as potential target images. As shown in FIG. 4, a source image 418 can be acquired or accessed, and a search query 420 can be acquired. The source image 418 can depict a face with black hair. A portion 422 of the source image 418 that depicts the face can be determined or identified. The search query 420 can correspond to text inputted by a user. In this example, the user intends to see how the face in the source image 418 could possible look with blonde hair.

Accordingly, a set of one or more target images (404, 410, and 414) that are associated with the search query ("blonde") 420 can be identified out of the plurality of images (402, 404, 406, 408, 410, 412, 414, and 416), since each of the one or more target images (404, 410, and 414) has blonde hair. Moreover, in this example, the set of one or more target images (404, 410, and 414) can also be identified or selected based on how well each target image matches the source image 418. For instance, image 402 is not included in the set of target images due to different face shapes between the image 402 and the source image 418; image 406 is not included due to pose differences; image 408 is not associated with the search query 420 and is also different in gender than that associated with the source image 418; image 412 is not included due to gender differences; and image 416 is not associated with the search query 420.

Continuing with the example scenario, respective locations (424, 426, and 428) within the identified target images (404, 410, and 414) at which the source image face portion 422 is to be rendered can be identified. Then for each identified target image (404, 410, and 414), the source image face portion 422 is rendered at the respective location (424, 426, and 428) within each target image (404, 410, and 414) to produce a set of combined images (430, 432, and 434). As shown, each combined image includes the source image face portion 422 rendered at the respective location (424, 426, and 428) within each target image (404, 410, and 414). It should be appreciated that there can be many variations associated with the disclosed technology.

Figure 5:
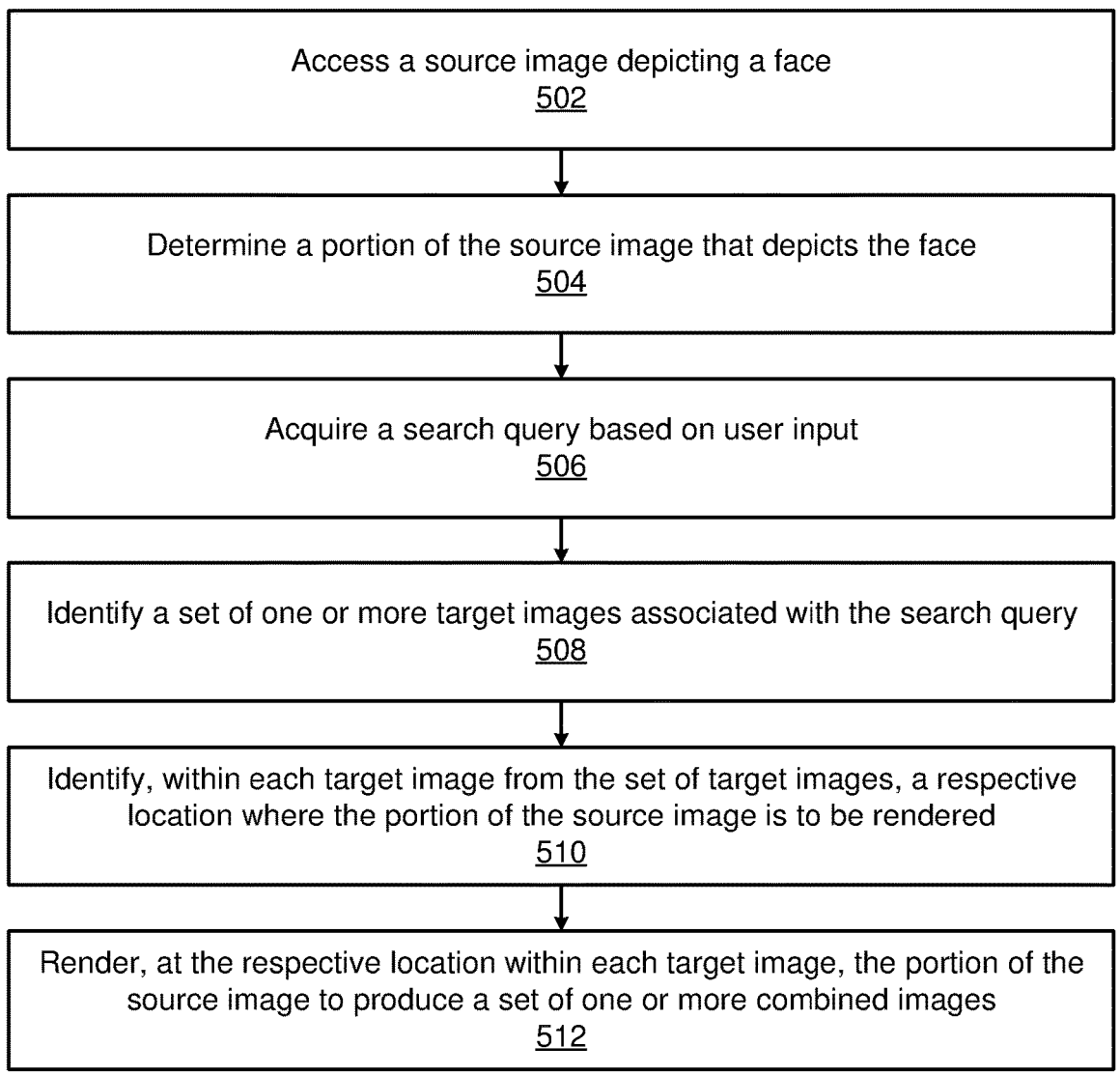
FIG. 5 illustrates a flowchart describing an example process associated with combining faces from source images with target images based on search queries, in accordance with an embodiment.

FIG. 5 illustrates a flowchart describing an example process 500 associated with combining faces from source images with target images based on search queries, in accordance with an embodiment. It should be understood that there can be additional, fewer, or alternative steps performed in similar or alternative orders, or in parallel, within the scope of the various embodiments unless otherwise stated.

In the example process 500, at block 502, a source image depicting a face can be acquired or accessed. At block 504, a portion of the source image that depicts the face can be determined or identified. At block 506, a search query can be acquired based on user input. At block 508, a set of one or more target images associated with the search query can be identified. At block 510, a respective location, within each target image from the set of one or more target images, at which the portion of the source image is to be rendered can be identified. At block 512, for each target image from the set of one or more target images, the portion of the source image can be rendered at the respective location within each target image to produce a set of one or more combined images. Each combined image in the set of one or more combined images can include the portion of the source image rendered at the respective location within each target image. Many variations are possible.

FIG. 6 illustrates a flowchart describing an example process 600 associated with combining faces from source images with target images based on search queries, in accordance with an embodiment. Again, it should be appreciated that there can be additional, fewer, or alternative steps performed in similar or alternative orders, or in parallel, within the scope of the various embodiments unless otherwise stated.

In the example process 600, at block 602, an image classification algorithm can be applied to each image in a plurality of images. At block 604, based on applying the image classification algorithm, it can be determined that each image in the plurality of images has a respective set of one or more associations with one or more search queries. At block 606, the plurality of images and the respective set of one or more associations for each image in the plurality of images can be stored prior to acquiring or accessing the source image depicting the face. The set of one or more target images can be identified from the plurality of images. As discussed, there can be many variations.

FIG. 7 illustrates a flowchart describing an example process 700 associated with combining faces from source images with target images based on search queries, in accordance with an embodiment. As discussed, additional, fewer, or alternative steps performed in similar or alternative orders, or in parallel, are possible. In some embodiments, the disclosed technology can be utilized with groups. In one example, the disclosed technology can be utilized when a group chat session uses a trigger term or keyword. In this example, the trigger term or keyword can be detected, such as based on natural language processing (NLP) technology, to correspond to the search query. In another example, the disclosed technology can be utilized when the source image depicts or represents multiple faces (e.g., including a second face).

In the example process 700, at block 702, a second portion of the source image that depicts a second face can be determined or identified. The set of one or more target images can be identified as having at least a first threshold confidence level of matching the face and having at least a second threshold confidence level of matching the second face. At block 704, a respective second location, within each target image from the set of one or more target images, at which the second portion of the source image is to be rendered can be identified. At block 706, for each target image from the set of one or more target images, the second portion of the source image can be rendered at the respective second location within each target image. Each combined image in the set of one or more combined images can further include the second portion of the source image rendered at the respective second location within each target image. Again, many variations are possible. For example, different weighting values and/or threshold confidence levels can be utilized for different faces in the source image.

In some implementations, the source image can be part of a source video, such as when the source image is a video image frame that is utilized to form the source video. Each target image can also be part of a respective target video, such as when a target image is a video image frame that is utilized to form a target video. Moreover, in some cases, various embodiments of the disclosed technology can be utilized with live video in real-time (or near real-time). For example, the source image can correspond to a video image frame that is part of a live stream video. Furthermore, in some instances, the source image can be part of a burst of images. The disclosed technology can enable an optimal image to be selected out of the burst of images to be the source image.

In some embodiments, various portions of the disclosed technology can be performed via a client device(s), a server (s), or any combination thereof. For example, in some cases, the client device can utilize one or more compressed models to perform various operations/functions associated with the disclosed technology.

In some implementations, multiple search terms (e.g., themes) can be included in the search query, whether for a single face or for multiple faces in the source image. The disclosed technology can provide a preview/thumbnail for each search query (or theme). In some cases, a user can select a particular preview/thumbnail for a particular search query in order to access additional target images (or more details) associated with the particular search query.

In some embodiments, an arcade mode can be activated. Additional objects, filters, or graphical elements (e.g., background objects, foreground filters, animations, etc.) can be identified, such as those relating to the search query and/or to the source image, and utilized with the disclosed technology.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
accessing, by a computing system, a source image depicting a face;
determining, by the computing system, a portion of the source image that depicts the face;
identifying a pose attribute associated with the face depicted via the portion of the source image, wherein the pose attribute is at least one of a head tilt or a head turn;
acquiring, by the computing system, a search query based on user input wherein the search query specifies metadata about an appearance of a person in a target image;
identifying, by the computing system, a set of one or more target images having metadata that satisfies the search query;
identifying, by the computing system, within each target image from the set of one or more target images, a respective location where the portion of the source image is to be rendered;
determining that each target image from the set of one or more target images has at least a threshold confidence level of matching the pose attribute associated with the face; and
rendering, by the computing system, for each target image from the set of one or more target images, at the respective location within each target image, the portion of the source image to produce a set of one or more combined images, wherein each combined image in the set of one or more combined images includes the portion of the source image rendered at the respective location within each target image.

2. The method of claim 1, further comprising:
applying an image classification algorithm to each image in a plurality of images;
determining, based on applying the image classification algorithm, that each image in the plurality of images has a respective set of one or more associations with one or more search queries; and
storing, prior to accessing the source image depicting the face, the plurality of images and the respective set of one or more associations for each image in the plurality of images, wherein the set of one or more target images is identified from the plurality of images.

3. The method of claim 1, wherein the respective location, within each target image from the set of one or more target images, where the portion of the source image is to be rendered is identified prior to accessing the source image depicting the face.

4. The method of claim 1, wherein determining that each target image from the set of one or more target images has at least the threshold confidence level of matching the pose attribute associated with the face is based on applying a similarity function to the respective set of one or more attributes associated with each target image and the pose attribute associated with the face.

5. The method of claim 1, wherein identifying the set of one or more target images associated with the search query includes determining that each target image from the set of one or more target images has at least a threshold confidence level of matching the search query.

6. The method of claim 1, wherein the user input includes at least one of: 1) a selection of the search query by a user out of a plurality of defined search queries provided to the user or 2) text inputted by the user for generating the search query.

7. The method of claim 1, further comprising:
determining a second portion of the source image that depicts a second face;
identifying a second pose attribute associated with the second face depicted via the second portion of the source image;
identifying, within each target image from the set of one or more target images, a respective second location where the second portion of the source image is to be rendered;
determining that each target image from the set of one or more target images has at least a threshold confidence level of matching the second pose attribute with the second face; and
rendering, for each target image from the set of one or more target images, the second portion of the source image at the respective second location within each target image, wherein each combined image in the set of one or more combined images further includes the second portion of the source image rendered at the respective second location within each target image.

8. The method of claim 1, wherein the source image is part of a source video, and wherein each target image is part of a respective target video.

9. A system comprising:
at least one processor; and
a memory storing instructions that, when executed by the at least one processor, cause the system to perform:
accessing a source image depicting a face;
determining a portion of the source image that depicts the face;
identifying a pose attribute associated with the face depicted via the portion of the source image, wherein the pose attribute is at least one of a head tilt or a head turn;
acquiring a search query based on user input wherein the search query specifies metadata about an appearance of a person in a target image;
identifying a set of one or more target images having metadata that satisfies the search query;
identifying, within each target image from the set of one or more target images, a respective location where the portion of the source image is to be rendered;
determining that each target image from the set of one or more target images has at least a threshold confidence level of matching the pose attribute associated with the face; and
rendering, for each target image from the set of one or more target images, at the respective location within each target image, the portion of the source image to produce a set of one or more combined images, wherein each combined image in the set of one or more combined images includes the portion of the source image rendered at the respective location within each target image.

10. The system of claim 9, wherein the instructions cause the system to further perform:
applying an image classification algorithm to each image in a plurality of images;
determining, based on applying the image classification algorithm, that each image in the plurality of images has a respective set of one or more associations with one or more search queries; and
storing, prior to accessing the source image depicting the face, the plurality of images and the respective set of one or more associations for each image in the plurality of images, wherein the set of one or more target images is identified from the plurality of images.

11. The system of claim 9, wherein determining that each target image from the set of one or more target images has at least the threshold confidence level of matching the pose attribute associated with the face is based on applying a similarity function to the respective set of one or more attributes associated with each target image and the pose attribute associated with the face.

12. The computer system of claim 9, wherein the respective location, within each target image from the set of one or more target images, where the portion of the source image is to be rendered is identified prior to accessing the source image depicting the face.

13. The computer system of claim 9, wherein identifying the set of one or more target images associated with the search query includes determining that each target image from the set of one or more target images has at least a threshold confidence level of matching the search query.

14. A non-transitory computer-readable storage medium including instructions that, when executed by at least one processor of a computing system, cause the computing system to perform a method comprising:
accessing a source image depicting a face;
determining a portion of the source image that depicts the face;
identifying a pose attribute associated with the face depicted via the portion of the source image, wherein the pose attribute is at least one of a head tilt or a head turn;
acquiring a search query based on user input wherein the search query specifies metadata about an appearance of a person in a target image;
identifying a set of one or more target images having metadata that satisfies the search query;
identifying, within each target image from the set of one or more target images, a respective location where the portion of the source image is to be rendered;
determining that each target image from the set of one or more target images has at least a threshold confidence level of matching the pose attribute associated with the face; and
rendering, for each target image from the set of one or more target images, at the respective location within each target image, the portion of the source image to produce a set of one or more combined images, wherein each combined image in the set of one or more combined images includes the portion of the source image rendered at the respective location within each target image.

15. The non-transitory computer-readable storage medium of claim 14, wherein the instructions cause the computing system to further perform:
applying an image classification algorithm to each image in a plurality of images;
determining, based on applying the image classification algorithm, that each image in the plurality of images has a respective set of one or more associations with one or more search queries; and
storing, prior to accessing the source image depicting the face, the plurality of images and the respective set of one or more associations for each image in the plurality of images, wherein the set of one or more target images is identified from the plurality of images.

16. The non-transitory computer-readable storage medium of claim 14, wherein determining that each target image from the set of one or more target images has at least the threshold confidence level of matching the pose attribute associated with the face is based on applying a similarity function to the respective set of one or more attributes associated with each target image and the pose attribute associated with the face.

17. The non-transitory computer-readable storage medium of claim 14, wherein the respective location, within each target image from the set of one or more target images, where the portion of the source image is to be rendered is identified prior to accessing the source image depicting the face.

18. The non-transitory computer-readable storage medium of claim 14, wherein identifying the set of one or more target images associated with the search query includes determining that each target image from the set of one or more target images has at least a threshold confidence level of matching the search query.

* * * * *